United States Patent
Ikeuchi et al.

(10) Patent No.: US 7,308,601 B2
(45) Date of Patent: Dec. 11, 2007

(54) PROGRAM, METHOD AND APPARATUS FOR DISK ARRAY CONTROL

(75) Inventors: Kazuhiko Ikeuchi, Kawasaki (JP); Mikio Ito, Kawasaki (JP); Hidejirou Daikokuya, Kawasaki (JP)

(73) Assignee: FUJITSU Limited, Kawasaki (JP)

( * ) Notice: Subject to any disclaimer, the term of this patent is extended or adjusted under 35 U.S.C. 154(b) by 619 days.

(21) Appl. No.: 10/978,432

(22) Filed: Nov. 2, 2004

(65) Prior Publication Data

US 2006/0015769 A1  Jan. 19, 2006

(30) Foreign Application Priority Data

Jul. 15, 2004  (JP)  ............... 2004-208298

(51) Int. Cl.
*G06F 11/00* (2006.01)
(52) U.S. Cl. ............................. 714/6; 714/11
(58) Field of Classification Search ................ 714/6, 714/7, 11, 13, 770; 711/114
See application file for complete search history.

(56) References Cited

U.S. PATENT DOCUMENTS

| | | | | |
|---|---|---|---|---|
| 4,608,688 A | * | 8/1986 | Hansen et al. ............... | 714/6 |
| 6,108,753 A | * | 8/2000 | Bossen et al. ............... | 711/118 |
| 6,920,592 B2 | * | 7/2005 | Spieker et al. ............... | 714/707 |
| 6,948,091 B2 | * | 9/2005 | Bartels et al. ................. | 714/11 |
| 7,139,942 B2 | * | 11/2006 | Subramanian et al. ....... | 714/710 |
| 2004/0268116 A1 | * | 12/2004 | Vasisht et al. ............... | 713/100 |
| 2005/0022078 A1 | * | 1/2005 | Subramanian et al. ....... | 714/710 |

* cited by examiner

*Primary Examiner*—Dieu-Minh Le
(74) *Attorney, Agent, or Firm*—Staas & Halsey LLP

(57) ABSTRACT

When receiving a notification of an error detected by patrol processing of the device adaptor for a secondary disk apparatus, a first recovery processing unit reads out data corresponding to the error location from a normal primary disk apparatus and writes the data into the error disk apparatus to eliminate the error. If it is determined that the content of the error notification is abnormality of the block ID which is an identifier of the order of writing data, a second recovery processing unit retrieves a correct write address indicated by the identifier, compares data of the error disk apparatus with that of the normal disk apparatus, determines that a lost write exists in the case of mismatch, and eliminates the lost write by writing the data read out from the normal disk apparatus into the error disk apparatus.

12 Claims, 9 Drawing Sheets

FIG. 1 PRIOR ART
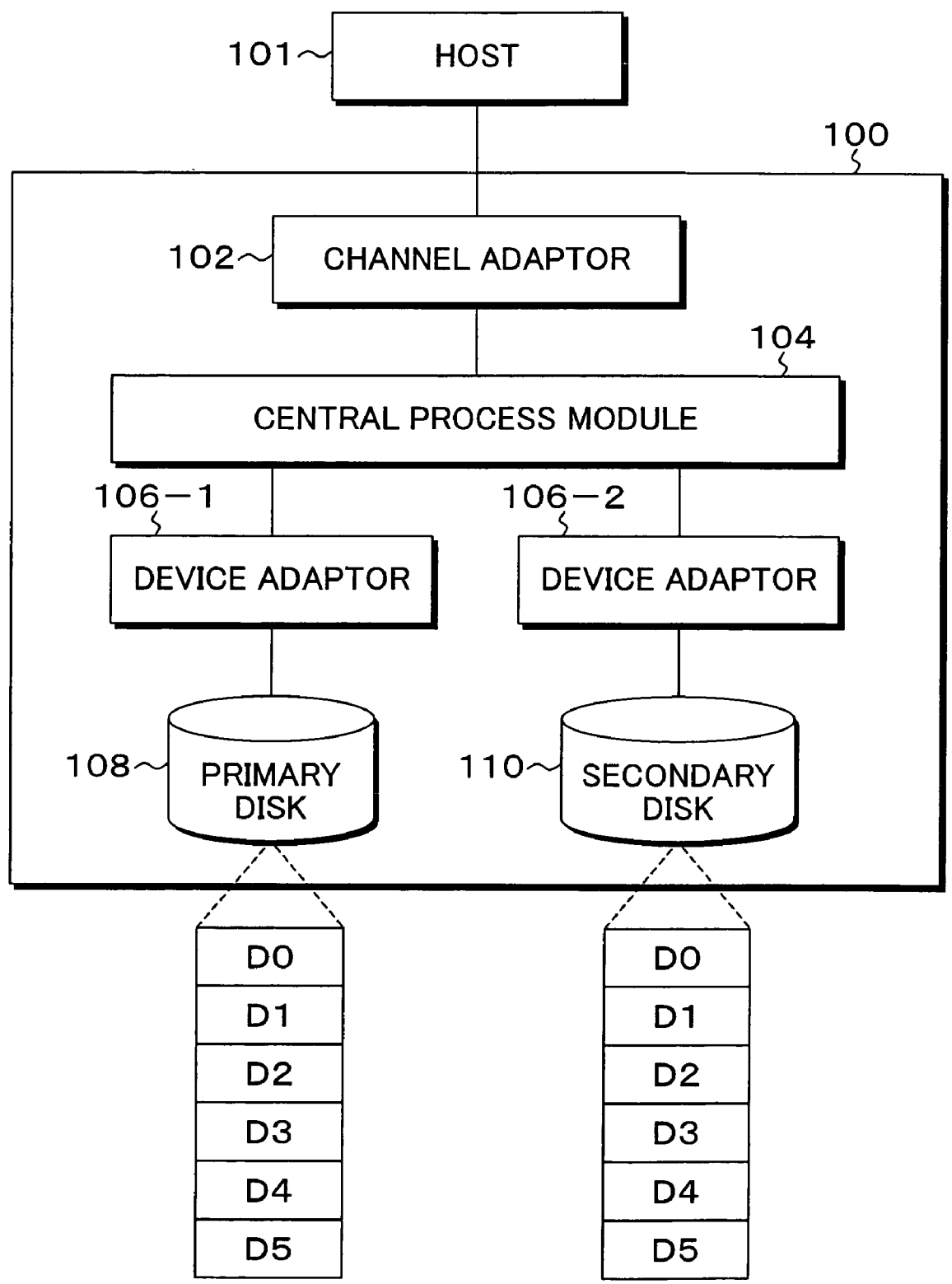

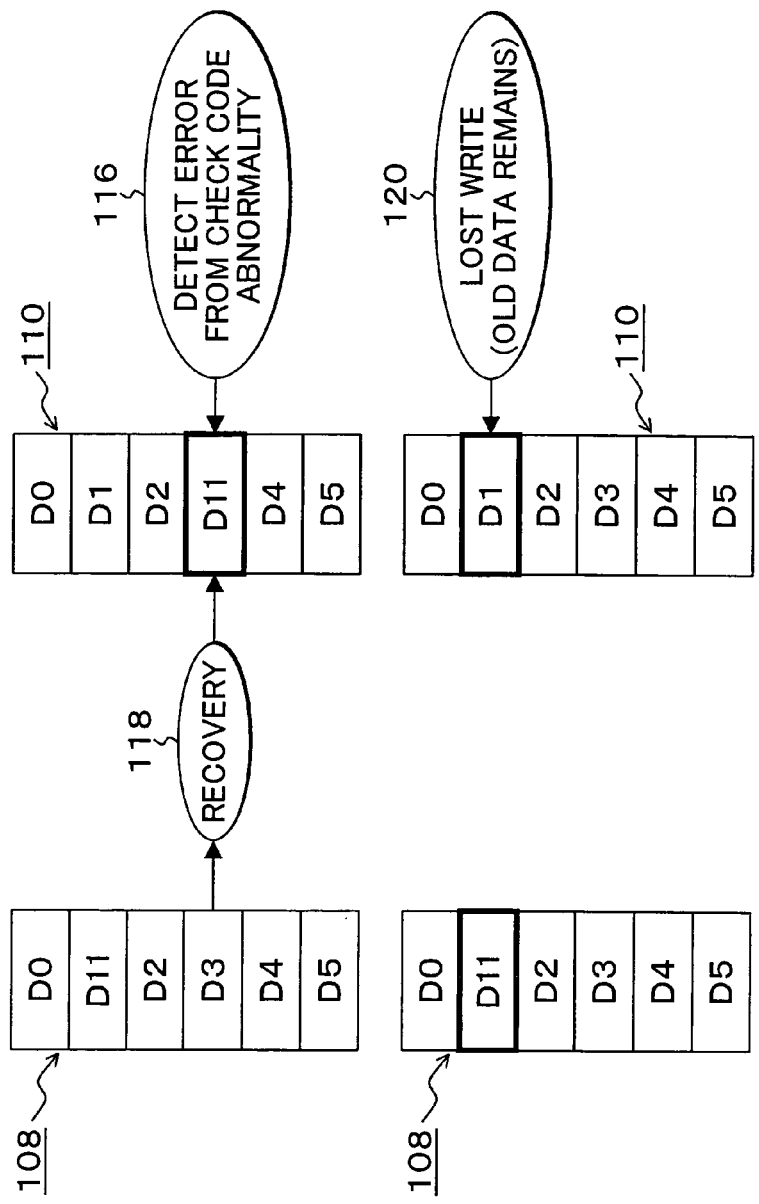
PRIOR ART
FIG. 2A
PRIOR ART
FIG. 2B
PRIOR ART
FIG. 2C

FIG. 3
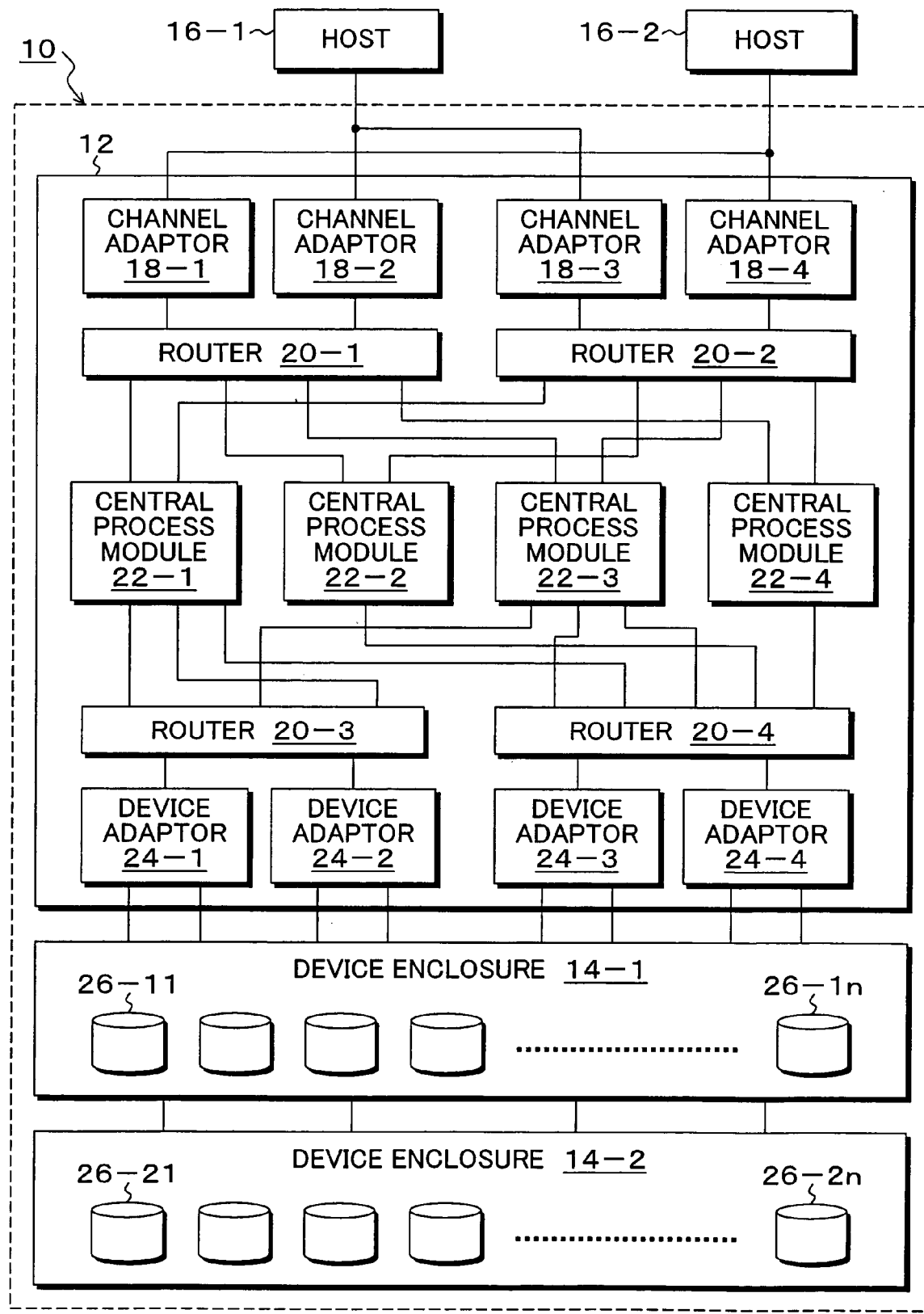

FIG. 4
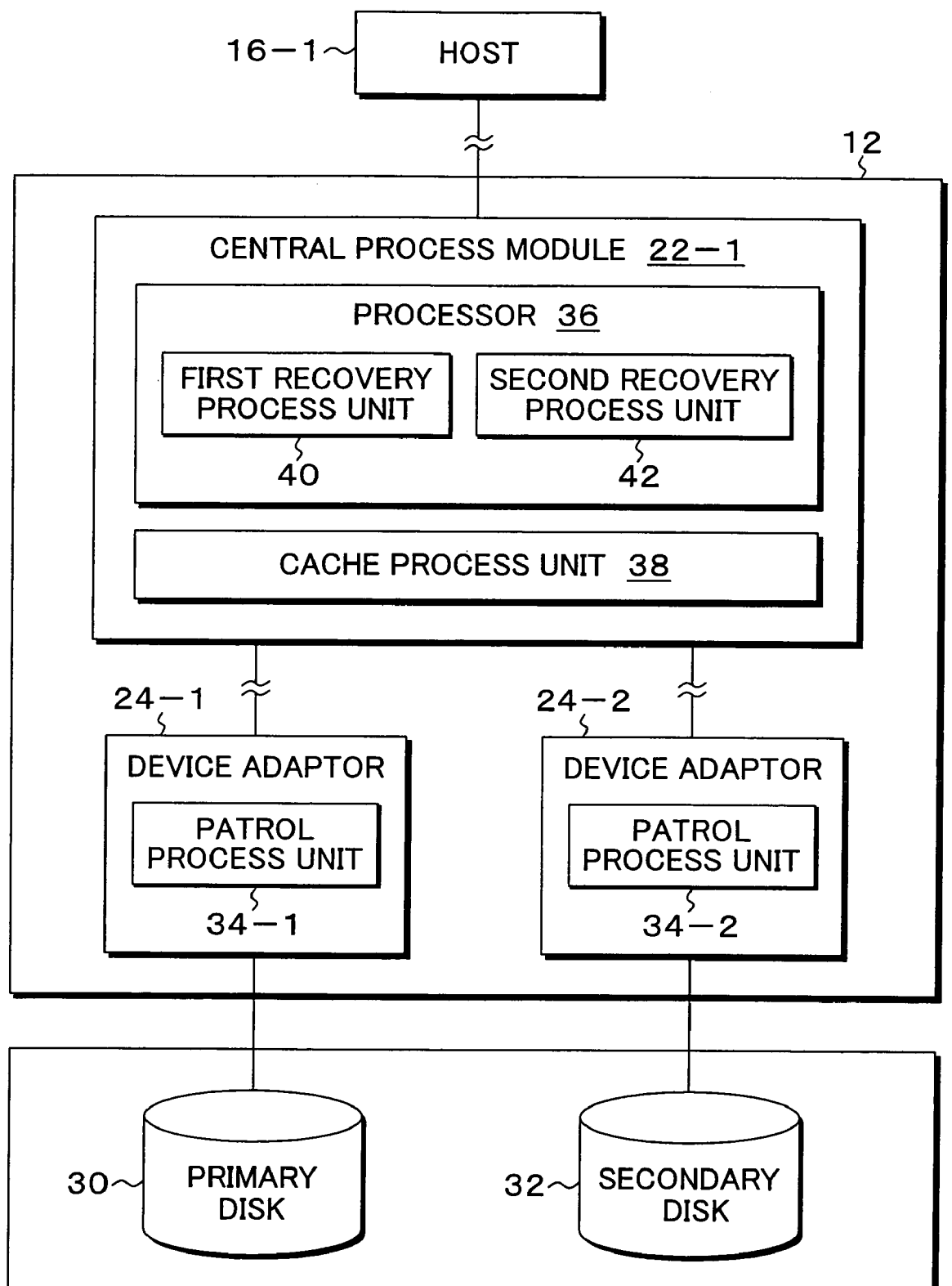

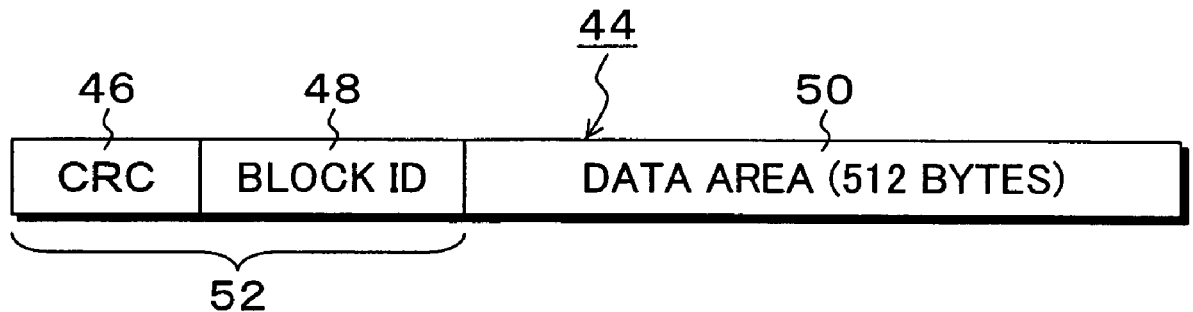
FIG. 5

FIG. 6A
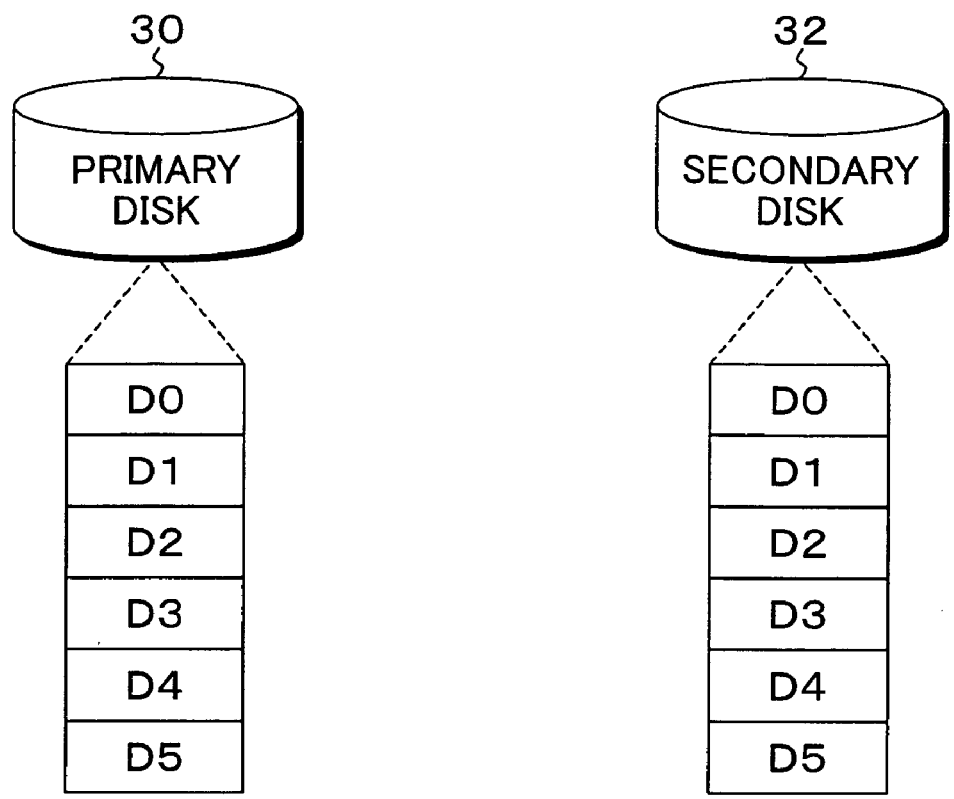
FIG. 6B
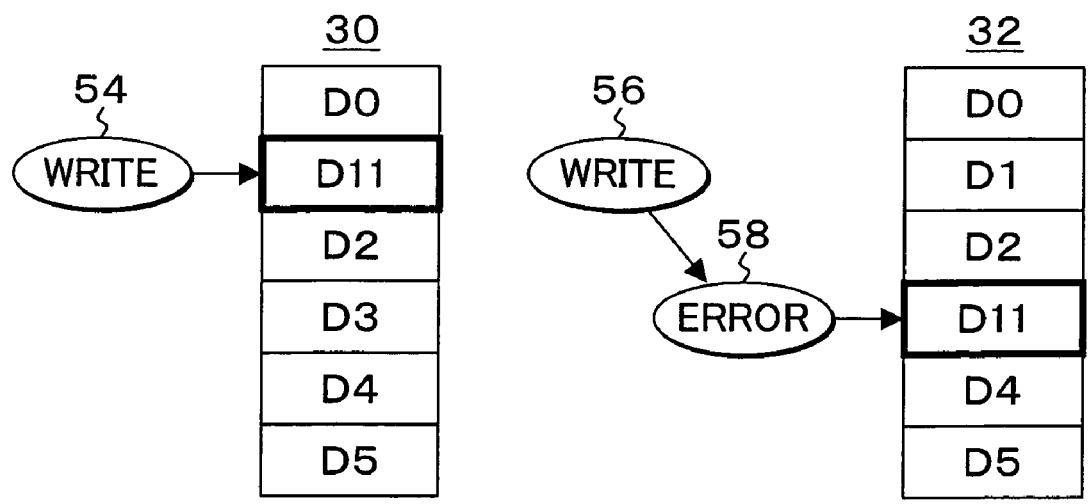

FIG. 6C
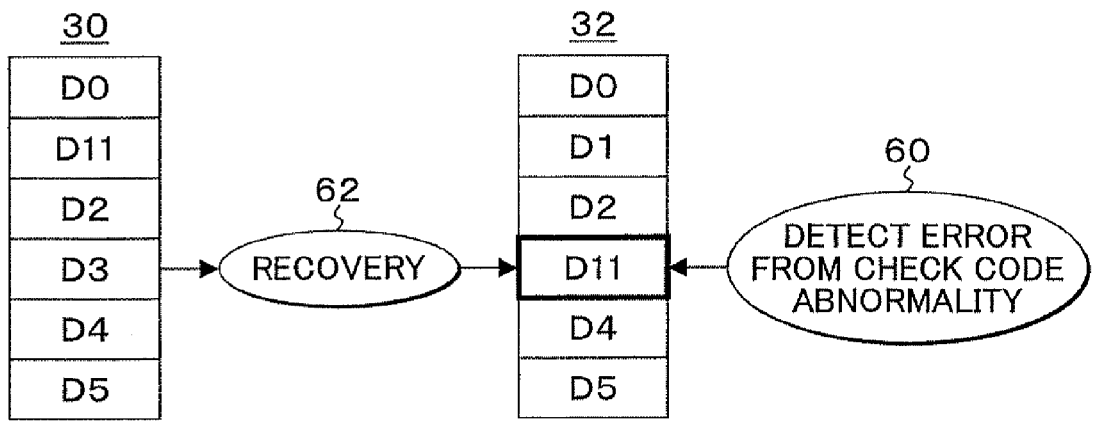
FIG. 6D
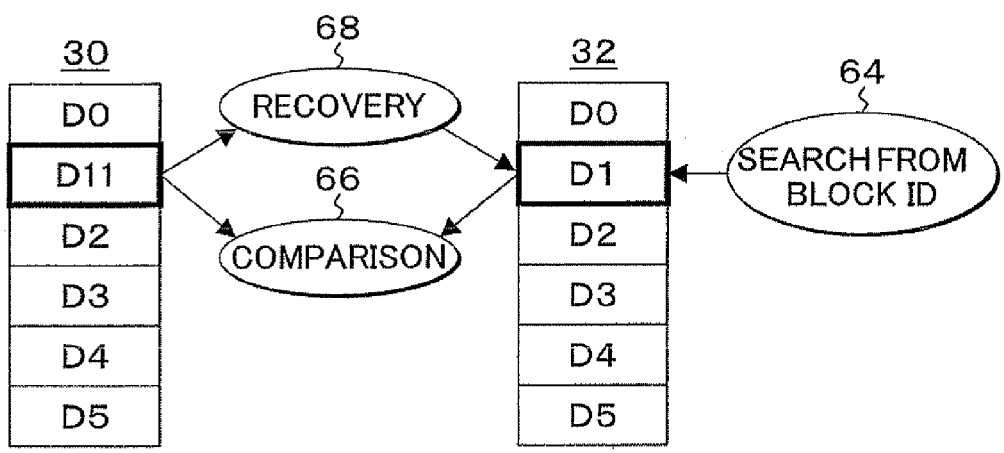
FIG. 6E
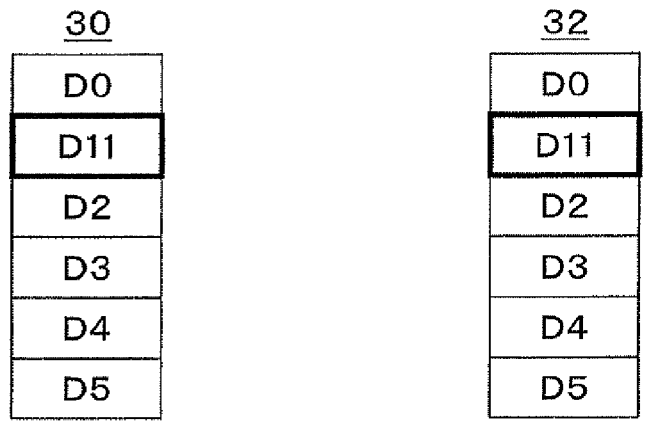

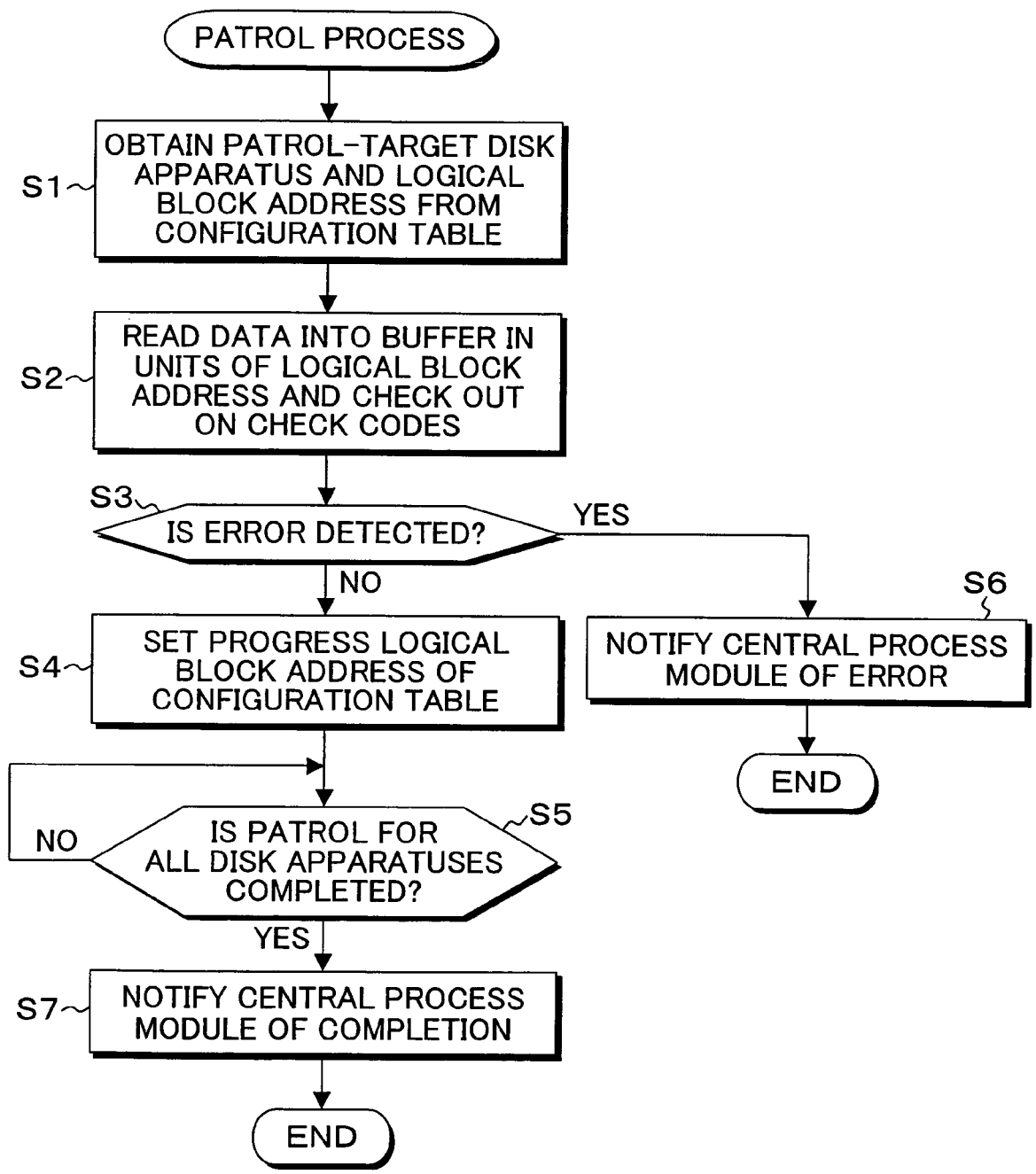

FIG. 8
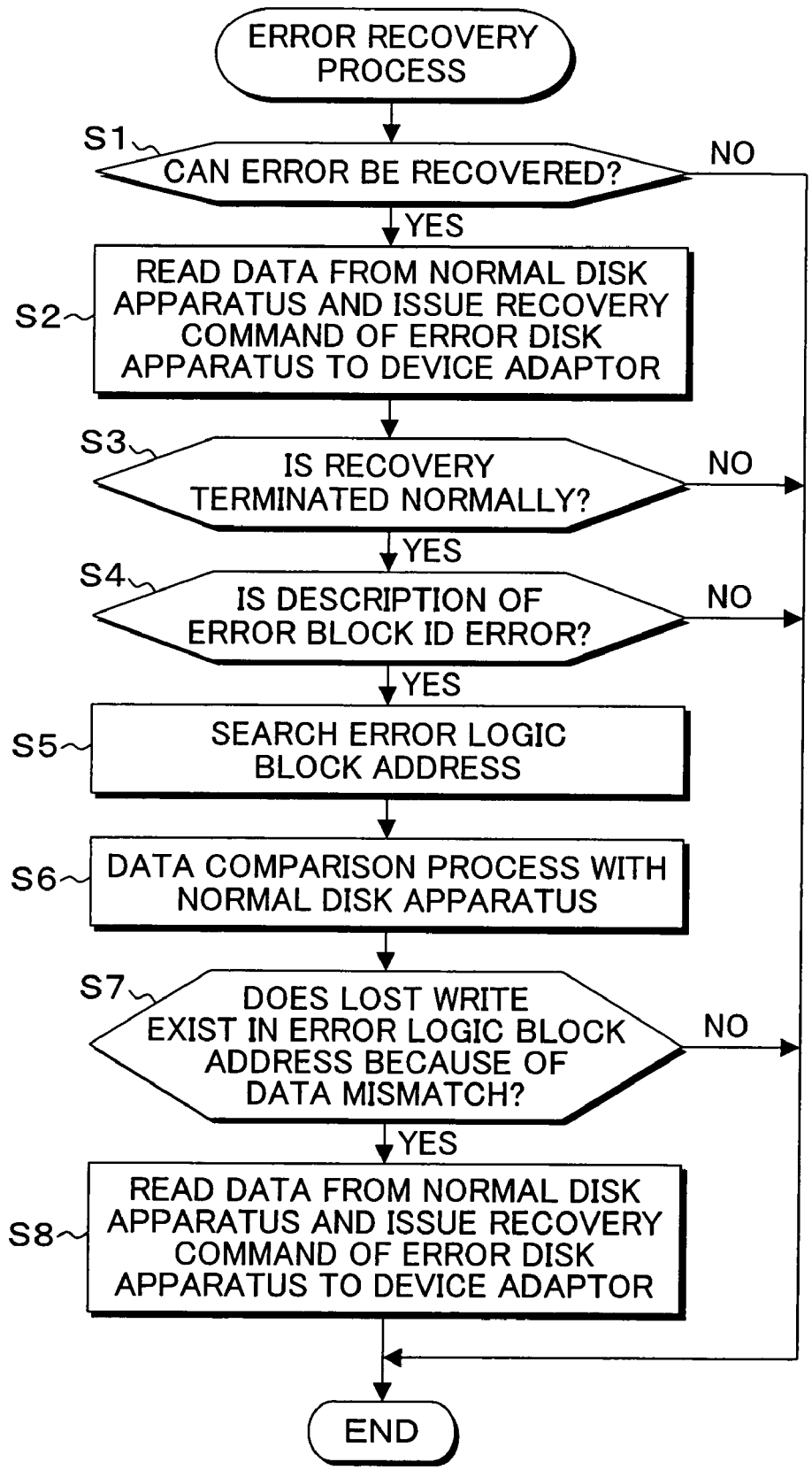

PROGRAM, METHOD AND APPARATUS FOR DISK ARRAY CONTROL

This application is a priority based on prior application No. JP 2004-208298, filed Jul. 15, 2004, in Japan.

BACKGROUND OF THE INVENTION

1. Field of the Invention

The present invention relates generally to a disk array control program, method and apparatus for processing input/output requests from an upper apparatus, directed to a disk array system provided with a plurality of disk apparatuses having redundant configuration and, more particularly, to a disk array control program, method and apparatus for recovering an error detected in patrol processing of a disk apparatus by writing data from a normal disk apparatus.

2. Description of the Related Arts

Conventionally, in a disk array subsystem comprising a disk apparatus with RAID level redundant configuration, a patrol processing is performed mainly for detecting a medium defect in the disk apparatus. FIG. 1 is a conventional disk array subsystem 100, which is provided with a channel adaptor 102 connecting a host 101, device adaptors 106-1, 106-2 connecting a primary disk 108 apparatus and a secondary disk apparatus 110 which are in RAID level redundant configuration, and a central processing module 104 which is disposed between the channel adaptor 102 and the device adaptors 106-1, 106-2 to process I/O requests from the host 101. A patrol function for the disk apparatus is provided in the device adaptors 106-1, 106-2 and, when a patrol execution command is received from the central processing module 104, the device adaptors 106-1, 106-2 execute a patrol processing for the own primary disk apparatus 108 and secondary disk apparatus 110. The patrol processing of the device adaptors 106-1, 106-2 is performed by reading out block data for each logical block address from a targeting disk apparatus to a buffer on the device adaptor and by checking a check code included in the block data to determine whether an error exists or not. If the device adaptor 106-2 detects an error for the secondary disk apparatus 110, the central processing module 104 is notified of the error and the processing is terminated. When the central processing module 104 is notified of the error by the device adaptor 106-2, if the error is a recoverable error other than the medium defect, the central processing module 104 eliminates the error by reading out data at a logical block address corresponding to the error location from the primary disk apparatus 108 which is a normal disk apparatus and by writing the data into the secondary disk apparatus 110 from which the error is detected (see, e.g., Japanese Patent Application Laid-Open Publication Nos. 2003-36146 and 1992-285773).

However, in such error recovery processing based on conventional patrol processing, although an error can be eliminated if an error of a disk apparatus is detected by the patrol processing, a following problem occurs, for write processing of a primary disk apparatus and a secondary disk apparatus in response to a write request from a host, if a write failure occurs in the secondary disk apparatus and if data at another address are rewritten instead of data at a correct address, for example. For the primary disk apparatus 108 and the secondary disk apparatus 110 of FIG. 1, a data storage situation is shown as taken before the write failure occurs and identical data are stored at identical addresses. In this situation, when old data D1 are rewritten by new data D11 in accordance with a write request 112 from the host as shown in FIG. 2A, it is assumed that data D3 at another address are rewritten by the new data D11 in the secondary disk apparatus 110 due to an error 114, although the primary disk apparatus 108 is rewritten normally. In the situation of FIG. 2A, if the patrol processing is performed in the secondary disk apparatus 110, a check code abnormality 116 is determined for the data D11 as shown in FIG. 2B and recovery processing 118 is performed for eliminating the error by reading out correct data D3 corresponding to the error location from the normal primary disk apparatus 108 and by writing the data into the secondary disk apparatus 110. However, in the secondary disk apparatus 110 in which the rewrite has not been performed correctly in FIG. 1A, the data D1 remains unchanged as the old data before the rewrite, resulting in a lost write 120, and does not consist with the new data D11 in the primary disk apparatus 108, and since redundancy of the data is still lost in this portion, a problem occurs that the redundancy can not be recovered by the conventional recovery processing.

SUMMARY OF THE INVENTION

According to the present invention there are provided a disk array control program, method and apparatus for eliminating the lost write and recovering the redundancy based on an error notification in accordance with a patrol processing, if the lost write exists in one of the disk systems with redundant configuration.

(Program)

The present invention provides a disk array control program. The disk array control program of the present invention is operable to drive a computer of a disk array control apparatus for processing I/O requests from an upper apparatus, directed to a disk array system provided with a plurality of disk apparatuses each having a redundant configuration to execute:

a first recovery processing step of, when notified of an error detected by patrol processing of the disk apparatuses, reading out data corresponding to a location of the error from a normal disk apparatus and writing the data into an error disk apparatus to thereby eliminate the error; and a second recovery processing step of, if it is determined that the content of the error notification is abnormality of an identifier indicating the order of writing data, retrieving a correct write address indicated by the identifier, comparing data of the error disk apparatus with data of the normal disk apparatus, determining that a lost write exists in case of mismatch, and writing data read out from the normal disk apparatus into the error disk apparatus to thereby eliminate the lost write.

The error notification based on the patrol processing has the content of the error detected by reading out block data written into the disk apparatus for each logical block address, the block data consisting of a cyclic redundancy checksum code, a block ID and data, and by checking the cyclic redundancy checksum code and the block ID. The second recovery step includes, if it is determined that the content of the error notification is an error indicating abnormality of the block ID, retrieving a correct logical block address indicated by the block ID, comparing data of the error disk apparatus with data of the normal disk apparatus, determining that a lost write exists in case of mismatch, and writing data read out from the normal disk apparatus into the error disk apparatus to thereby eliminate the lost write.

The disk array control apparatus includes a channel adaptor to connect the upper apparatus, a device adaptor to connect the disk apparatus, and a central processing module disposed between the channel adaptor and the device adaptor to process I/O requests from the upper apparatus. The computer executing the disk array control program is disposed in the central processing module. The plurality of disk apparatuses each having a redundant configuration are a pair of disk apparatuses having a redundant configuration at RAID level in which identical data are stored at identical addresses.

(Method)

The present invention provides a disk array control method. The method of the invention is operable to process I/O requests from an upper apparatus, directed to a disk array system provided with a plurality of disk apparatuses each having a redundant configuration, the method comprising:

a first recovery processing step of, when notified of an error detected by patrol processing of the disk apparatuses, reading out data corresponding to a location of the error from a normal disk apparatus and writing the data into an error disk apparatus to thereby eliminate the error; and a second recovery processing step of, if it is determined that the content of the error notification is abnormality of an identifier indicating the order of writing data, retrieving a correct write address indicated by the identifier, comparing data of the error disk apparatus with data of the normal disk apparatus, determining that a lost write exists in case of mismatch, and writing data read out from the normal disk apparatus into the error disk apparatus to thereby eliminate the lost write.

The error notification based on the patrol processing has the content of the error detected by reading out block data consisting of a cyclic redundancy checksum code, a block ID and data, the block data being written into the disk apparatus for each logical block address, and by checking the cyclic redundancy checksum code and the block ID. The second recovery step includes, if it is determined that the content of the error notification is an error indicating abnormality of the block ID, retrieving a correct logical block address indicated by the block ID, comparing data of the error disk apparatus with data of the normal disk apparatus, determining that a lost write exists in case of mismatch, and writing data read out from the normal disk apparatus into the error disk apparatus to thereby eliminate the lost write.

(Apparatus)

The present invention provides a disk array control apparatus. The disk array control apparatus of the present invention is operable to process I/O requests from an upper apparatus, directed to a disk array system provided with a plurality of disk apparatuses each having a redundant configuration, the disk array control apparatus comprising a first recovery processing unit operable to, when notified of an error detected by patrol processing of the disk apparatuses, read out data corresponding to a location of the error from a normal disk apparatus to write the data into an error disk apparatus to thereby eliminate the error; and a second recovery processing unit operable to, if it is determined that the content of the error notification is abnormality of an identifier indicating the order of writing data, retrieve a correct write address indicated by the identifier to compare data of the error disk apparatus with data of the normal disk apparatus, the second recovery processing unit determining in case of mismatch that a lost write exists and writing data read out from the normal disk apparatus into the error disk apparatus to thereby eliminate the lost write. The disk array control apparatus includes a channel adaptor to connect the upper apparatus, a device adaptor to connect the disk apparatus, and a central processing module located between the channel adaptor and the device adaptor to process I/O requests from the upper apparatus. The first and the second recovery processing units are disposed in the central processing module. The disk apparatus is written with block data for each logical block address, the block data consisting of a cyclic redundancy checksum code, a block ID and data. The device adaptor includes a patrol processing unit operable to read out block data from the disk apparatus connected to a subordinate thereof, the patrol processing unit checking the cyclic redundancy checksum code and the block ID to notify the central processing module of an error when the error is detected. If it is determined that the content of the error notification is an error indicating abnormality of the block ID, the second recovery processing unit retrieves a correct logical block address indicated by the block ID to compare data of the error disk apparatus with data of the normal disk apparatus, the second recovery processing unit determining that a lost write exists in case of mismatch to write data read out from the normal disk apparatus into the error disk apparatus to thereby eliminate the lost write.

The present invention provides a storage apparatus having a first memory unit, a second memory unit and a control unit connected to the first and the second memory units to control data input and output to/from the first and the second memory units, the storage apparatus comprising a recovery processing unit operable to, if an error is detected by patrol processing of the memory unit, compare data stored in the first memory unit with data stored in the second memory unit based on location information of the error-detected data, the recovery processing unit recovering, by use of data stored in one of the memory units, data stored in the other based on the result of the comparison.

According to the present invention, if a lost write exists in one of the disk apparatuses in redundant configuration, the lost write is eliminated and redundancy can be recovered, based on an error notification in accordance with the patrol processing. The above and other objects, features and advantages of the present invention will become more apparent from the following detailed description with reference to the drawings.

BRIEF DESCRIPTION OF THE DRAWINGS

FIG. 1 is an explanatory view of conventional disk array subsystem;

FIGS. 2A to 2C are explanatory views of conventional recovery process in the case that a write error is generated on the secondary side in concurrent write processing for primary disk apparatus and secondary disk apparatus;

FIG. 3 is a block diagram of disk array subsystem to which the present invention is applied;

FIG. 4 is a block diagram of embodiment of disk array control apparatus according to the present invention, targeting redundant configuration of RAID 1;

FIG. 5 is an explanatory view of block data read out from disk apparatus of FIG. 4;

FIGS. 6A and 6B are explanatory views of the case that a write error is generated on the secondary side in concurrent write processing for primary disk apparatus and secondary disk apparatus;

FIGS. 6C to 6E are explanatory views of two-stage recovery processing according to the present invention for write error of FIGS. 6A and 6B;

FIG. 7 is a flowchart of patrol process by means of device adaptor of FIG. 4; and FIG. 8 is a flowchart of error recovery process of the present invention by means of central process module of FIG. 4.

DETAILED DESCRIPTION OF THE PREFERRED EMBODIMENT

FIG. 3 is a block diagram of a disk array subsystem to which the present invention is applied. In FIG. 3, the disk array sub system 10 consists of a disk array control apparatus 12 and device enclosures 14-1, 14-2. The disk array control apparatus 12 is provided with channel adaptors 18-1 to 18-4, routers 20-1, 20-2, central processing modules 22-1 to 22-4, routers 20-3, 20-4 and device adaptors 24-1 to 24-4. The channel adaptors 18-1 to 18-4 are connected with hosts 16-1, 16-2. The device enclosures 14-1 and 14-2 are provided with disk apparatuses 26-11 to 26-1n which are in redundant configuration with combinations of multiple disk apparatuses, and in the embodiment of the present invention, a case of RAID 1 redundant configuration is taken as an example. It should be noted that the present invention is not limited to RAID 1, and any RAID level can be applied as long as mirror configurations are used.

FIG. 4 is a block diagram of an embodiment of the disk array control apparatus according to the present invention, targeting RAID 1 redundant configuration. In FIG. 4, the disk array control apparatus 12 is shown by taking out a portion of the central processing module 22-1 and the device adaptors 24-1, 24-2 of FIG. 3. As a disk array 28 to the device adaptors 24-1, 24-2, a primary disk apparatus 30 and a secondary disk apparatus 32 are shown as a pair of disk apparatuses in redundant configuration, and both of the disk apparatuses store identical data at identical addresses. In the case of this redundant configuration with the primary disk apparatus 30 and the secondary disk apparatus 32, to a read request from a host 16-1, a read response is performed from the predetermined primary disk 30, for example. For a write request from the host 16-1, a write processing is performed for writing into both of the primary disk apparatus 30 and the secondary disk apparatus 32. The device adaptors 24-1 and 24-2 are provided with patrol processing units 34-1, 34-2. The patrol processing units 34-1 and 34-2 operate when receiving a patrol execution command from the central processing module 22-1 and execute the patrol processing for each of the own primary disk apparatus 30 and secondary disk apparatus 32. In the patrol processing, block data are read out from the own disk apparatuses and are stored in buffers on the device adaptors, and whether an error exists or not is detected by checking a check code of the block data stored in the buffer.

A format structure shown in FIG. 5 is possessed by the block data which is read out from each of the primary disk apparatus 30 and the secondary disk apparatus 32 by the patrol processing units 34-1, 34-2. In FIG. 5, the block data 44 consist, in order, of a CRC code (Cyclic Redundancy Checksum code 46), a block ID 48 and a data area 50. The CRC code 46 is generated from data in the data area 50, and by using this CRC code 46, an error can be detected from the data stored in the data area 50. The block ID 48 is a value indicating an order of writing locations for the disk apparatus, and if writing is performed correctly and if block number data are read out in a sequential order, the block ID 48 can be obtained as a consecutive number. Among these block data 44, the CRC code 46 and the block ID 48 are considered as a check code 52, and 8 bytes are used in this example. Also, 512 bytes are allocated to the data area; one (1) block data is composed of the 512 bytes data area; and a writing location of the block data is specified by a logical block address (LBA) in the case that the primary disk apparatus 30 and the secondary disk apparatus 32 are handled as physical logic devices.

Referring again to FIG. 4, the central processing module 22-1 is provided with a processor 36 and a cache processing unit 38. The processor 36 is provided with a first recovery processing unit 40 and a second recovery processing unit 42 for the recovery processing according to the present invention. When receiving a notification of an error detected by the patrol processing units 34-1, 34-2 of the device adaptors 24-1, 24-2, the first recovery processing unit 40 reads out data corresponding to the error location from a normal disk apparatus and writes the data into a disk apparatus where the error is detected to eliminate the error. After the recovery is succeeded in the first recovery processing unit 40, if it is determined that the content of the error notification is abnormality of the block ID 48 in the block data 44 of FIG. 5, which is an identifier of the order of writing data, i.e., it is determined that the block ID 48 of the read block data 44 is not a consecutive number, the second recovery processing unit 42 retrieves a correct write address indicated by the block ID 48, compares data of the error disk apparatus with that of the normal disk apparatus, determines that a lost write exists if the data do not match and eliminates the lost write by writing the data read out from the normal disk apparatus into the error disk apparatus.

FIGS. 6A and 6B are explanatory views of the case that a write failure is generated on the secondary side in concurrent write processing for the primary disk apparatus 30 and the secondary disk apparatus 32 of FIG. 4. FIG. 6A is a data storage situation of the primary disk apparatus 30 and the secondary disk apparatus 32 before the write failure is generated, and identical data are stored at identical locations. In this situation, as shown in FIG. 6B, write requests 54, 56 are generated for address locations of data D11 in the primary disk apparatus 30 and the secondary disk apparatus 32; in the primary disk apparatus 30, old data at correct address locations are rewritten by new data D11 in accordance with the write request 54: and, in the secondary disk apparatus, however, an error 58 is generated during the write processing 56, and a write failure occurs wherein data D3 at another address location is accidentally rewritten by the new data D11. For such a write failure in the secondary disk apparatus 32, as shown in FIG. 6C, by executing the patrol processing with the patrol processing unit 34-1 of the device adaptor 24-1 for reading out the data block of the data D11 in the secondary disk apparatus 32 to check the check code, it is determined that the block ID is not a consecutive number, and an error detection 60 is performed due to the check code abnormality. This error detection 60 is notified to the central processing module 22-1 of FIG. 4; the first recovery processing unit 40 is activated in the processor 36; after reading out data D3 corresponding to the error location from the primary disk apparatus 30 which is a normal disk apparatus and deploying the data on the cache of the cache processing unit 38, an error notification is performed to execute the recovery processing of the first recovery processing unit 40 wherein the device adaptor is instructed to write the data into the error location; and correct data D3 is written in place of the data D11 which are target of the error detection in the secondary disk apparatus 32. Subsequently, as shown in FIGS. 6C to 6E, if the abnormality of the block ID is the detail of the error notification received by the second recovery processing unit 42 of FIG. 4 from the patrol processing unit 34-2, retrieve processing 64 is performed for a correct address location, and comparison processing 66 is performed for comparing the data D11 of the primary disk apparatus 30 with the Data D1 of the secondary disk apparatus 32 at the retrieved address. If the data of the primary disk apparatus 30 and the secondary disk apparatus 32 do not match in the comparison processing 66, it is determined that a lost write exists for the data D1 of the secondary disk apparatus 32 where the error is detected; and the second recovery process unit 42 of FIG. 4 reads out the data D11 at the retrieved address location in the primary disk apparatus 30, deploys the data on the cache of the cache processing unit 38, and then, executes recovery processing 68 by instructing the device adaptor 24-2 detecting the error to write the data D11 into the retrieved address location. This second recovery processing 68 eliminates the lost write remaining in the secondary disk apparatus 32, and the data of the primary disk apparatus 30 and the secondary disk apparatus 32 can be recovered to the state of the redundant configuration that the data will be identical in all the identical locations.

FIG. 7 is a flowchart of the patrol processing of the patrol processing units 34-1, 34-2 provided in the device adaptors 24-1, 24-2 of FIG. 4. In FIG. 7, the patrol processing are activated in response to a patrol execution command from the central processing module 22-1. The patrol execution command is issued at any timing such as at the time of activation of the apparatus. In FIG. 7, a patrol-target disk apparatus and a logical block address are obtained from a configuration table provided in the device adaptor in step S1. The disk apparatus owned by the device adaptor and the patrol-target logical block address area are registered in the configuration table in advance. Then, in step S2, the check codes are checked by reading the block data into the buffer on the device adaptor for each logical block address. In this checking, if an error is detected in step S3, the procedure proceeds to step S6, and the error is notified to the central processing module to terminate the patrol processing. If the error is not detected in step S3, the procedure proceeds to step S4 to set a progress logical block address of the configuration table, and then, in step S5, it is checked whether the patrol is completed for all the patrol-target disk apparatuses, and if the patrol is completed, the completion is notified to the central processing module in step S7 to terminate the processing.

FIG. 8 is a flowchart of an error recovery processing of the present invention by means of the central process module 22-1 of FIG. 4. This error recovery processing is activated in response to the error notification from the patrol processing of the device adaptor. When the error recovery processing is activated, in step S1, it is checked whether the error can be recovered or not from the content of the error notification. Since the patrol processing mainly is the processing for confirming whether a medium defect exists or not, if the content of the error is a medium defect, the process is terminated because the error can not be recovered. If the error can be recovered, the procedure proceeds to step S2, and by reading data at an address corresponding to the error location in the normal disk apparatus onto the cache and by issuing a recovery command for the error-detected disk apparatus to the device adaptor, the data read from the normal disk apparatus are written into the error disk apparatus to eliminate the error. Subsequently, if it is determined that the recovery is terminated normally in step S3, the procedure proceeds to step S4 to check whether the content of the error is a block ID error in an identifier indicating the order of the block data or not. In the case of the block ID error, the procedure proceeds to step S5 to retrieve a correct logical block address indicated by the block ID determined as the error, and in step S6, the data of the normal disk apparatus and the error disk apparatus are read out and compared at the retrieved logical block address. In step S7, it is determined that a lost write exists at the error logical block address if compared data do not match, and in step S8, after correct data are read out from the normal disk apparatus and deployed on the cache, by issuing a recovery command for the error disk to the error-side device adaptor, the correct block data are written at the address location determined as the lost write to recover the redundant configuration.

Also, the present invention provides a disk array control program executed by a computer provided in a disk array subsystem, and the disk array control program executes the processing in accordance with the flowchart of the error recovery process of FIG. 8. The disk array control program of the present invention is executed by the processor 36 of the central processing module 22-1 shown in FIG. 4. As hardware resources of the computer achieved by the processor 36, CPU, RAM, a hard disk drive and the like are provided. The hard disk drive is loaded with the disk array control program executing the first recovery processing unit 40 and the second recovery processing unit 42 of the present invention, and at the time of activation of the computer, the program is read out form the hardware drive, deployed on RAM and executed by CPU.

The present invention encompasses any alterations without impairing the object and the advantages thereof and is not limited by the numerical values shown in the above embodiments.

What is claimed is:

1. A disk array control program operable to drive a computer of a disk array control apparatus for processing I/O requests from an upper apparatus, directed to a disk array system provided with a plurality of disk apparatuses each having a redundant configuration to execute:

a first recovery processing step of, when notified of an error detected by patrol processing of the disk apparatuses, reading out data corresponding to a location of the error from a normal disk apparatus and writing the data into an error disk apparatus to thereby eliminate the error; and a second recovery processing step of, if it is determined that the content of the error notification is abnormality of an identifier indicating the order of writing data, retrieving a correct write address indicated by the identifier, comparing data of the error disk apparatus with data of the normal disk apparatus, determining that a lost write exists in case of mismatch, and writing data read out from the normal disk apparatus into the error disk apparatus to thereby eliminate the lost write.

2. The disk array control program of claim 1, wherein the error notification has the content of the error detected by reading out block data written into the disk apparatus for each logical block address, the block data consisting of a cyclic redundancy checksum code, a block ID and data, and by checking the cyclic redundancy checksum code and the block ID, and wherein the second recovery step includes, if it is determined that the content of the error notification is an error indicating abnormality of the block ID, retrieving a correct logical block address indicated by the block ID, comparing data of the error disk apparatus with data of the normal disk apparatus, determining that a lost write exists in case of mismatch, and writing data read out from the normal disk apparatus into the error disk apparatus to thereby eliminate the lost write.

3. The disk array control program of claim 1, wherein the disk array control apparatus includes a channel adaptor to connect the upper apparatus, a device adaptor to connect the disk apparatus, and a central processing module disposed between the channel adaptor and the device adaptor to process I/O requests from the upper apparatus, and wherein the computer is disposed in the central processing module.

4. The disk array control program of claim 1, wherein the plurality of disk apparatuses each having a redundant configuration are a pair of disk apparatuses having a redundant configuration at RAID level in which identical data are stored at identical addresses.

5. A disk array control method for processing I/O requests from an upper apparatus, directed to a disk array system provided with a plurality of disk apparatuses each having a redundant configuration, the method comprising:

a first recovery processing step of, when notified of an error detected by patrol processing of the disk apparatuses, reading out data corresponding to a location of the error from a normal disk apparatus and writing the data into an error disk apparatus to thereby eliminate the error; and a second recovery processing step of, if it is determined that the content of the error notification is abnormality of an identifier indicating the order of writing data, retrieving a correct write address indicated by the identifier, comparing data of the error disk apparatus with data of the normal disk apparatus, determining that a lost write exists in case of mismatch, and writing data read out from the normal disk apparatus into the error disk apparatus to thereby eliminate the lost write.

6. The disk array control method of claim 5, wherein the error notification has the content of the error detected by reading out block data consisting of a cyclic redundancy checksum code, a block ID and data, the block data being written into the disk apparatus for each logical block address, and by checking the cyclic redundancy checksum code and the block ID, and wherein the second recovery step includes, if it is determined that the content of the error notification is an error indicating abnormality of the block ID, retrieving a correct logical block address indicated by the block ID, comparing data of the error disk apparatus with data of the normal disk apparatus, determining that a lost write exists in case of mismatch, and writing data read out from the normal disk apparatus into the error disk apparatus to thereby eliminate the lost write.

7. The disk array control method of claim 5 wherein the disk array control apparatus includes a channel adaptor to connect the upper apparatus, a device adaptor to connect the disk apparatus, and a central processing module disposed between the channel adaptor and the device adaptor to process I/O requests from the upper apparatus, and wherein the first and the second recovery processing steps are executed by the central processing module.

8. The disk array control method of claim 5, wherein the plurality of disk apparatuses each having a redundant configuration are a pair of disk apparatuses having a redundant configuration at RAID level in which identical data are stored at identical addresses.

9. A disk array control apparatus for processing I/O requests from an upper apparatus, directed to a disk array system provided with a plurality of disk apparatuses each having a redundant configuration, the disk array control apparatus comprising:

a first recovery processing unit operable to, when notified of an error detected by patrol processing of the disk apparatuses, read out data corresponding to a location of the error from a normal disk apparatus to write the data into an error disk apparatus to thereby eliminate the error; and a second recovery processing unit operable to, if it is determined that the content of the error notification is abnormality of an identifier indicating the order of writing data, retrieve a correct write address indicated by the identifier to compare data of the error disk apparatus with data of the normal disk apparatus, the second recovery processing unit determining in case of mismatch that a lost write exists and writing data read out from the normal disk apparatus into the error disk apparatus to thereby eliminate the lost write.

10. The disk array control apparatus of claim 9, wherein the disk array control apparatus includes a channel adaptor to connect the upper apparatus, a device adaptor to connect the disk apparatus, and a central processing module located between the channel adaptor and the device adaptor to process I/O requests from the upper apparatus, wherein the first and the second recovery processing units are disposed in the central processing module, wherein the disk apparatus is written with block data for each logical block address, the block data consisting of a cyclic redundancy checksum code, a block ID and data, and wherein the device adaptor includes a patrol processing unit operable to read out block data from the disk apparatus connected to a subordinate thereof, the patrol processing unit checking the cyclic redundancy checksum code and the block ID to notify the central processing module of an error when the error is detected.

11. The disk array control apparatus of claim 10, wherein, if it is determined that the content of the error notification is an error indicating abnormality of the block ID, the second recovery processing unit retrieves a correct logical block address indicated by the block ID to compare data of the error disk apparatus with data of the normal disk apparatus, the second recovery processing unit determining that a lost write exists in case of mismatch to write data read out from the normal disk apparatus into the error disk apparatus to thereby eliminate the lost write.

12. The disk array control apparatus of claim 9, wherein the plurality of disk apparatuses each having a redundant configuration are a pair of disk apparatuses having a redundant configuration at RAID level in which identical data are stored at identical addresses.

* * * * *